Sept. 19, 1967 W. W. BLAKLEY ET AL 3,341,957

SELECTING DEVICE FOR FILM STRIPS

Filed Jan. 25, 1965

2 Sheets-Sheet 1

WALTER W. BLAKLEY
ROBERT B. SMITH
INVENTORS

BY R. Frank Smith

Lloyd F. Seebach

ATTORNEY & AGENT

Sept. 19, 1967 W. W. BLAKLEY ET AL 3,341,957

SELECTING DEVICE FOR FILM STRIPS

Filed Jan. 25, 1965 2 Sheets-Sheet 2

WALTER W. BLAKLEY
ROBERT B. SMITH
INVENTORS

BY R. Frank Smith
Lloyd F. Seebach
ATTORNEY & AGENT

United States Patent Office 3,341,957
Patented Sept. 19, 1967

3,341,957
SELECTING DEVICE FOR FILM STRIPS

Walter W. Blakley and Robert B. Smith, Rochester, N.Y., assignors to Eastman Kodak Company, Rochester, N.Y., a corporation of New Jersey Filed Jan. 25, 1965, Ser. No. 427,798
15 Claims. (Cl. 40—79)

The present invention relates to the storage and retrieval of recorded information. More particularly, the present invention relates to a device for selecting a predetermined information-bearing member from a file formed from a plurality of similar members.

Spacious storage needs for a continually growing quantity of recorded information have been greatly diminished by microreproduction of the information bearing records, such as for example by microfilming. Furthermore, microreproducing such records has facilitated the retrieval and use thereof and has placed a vast storehouse of information at a user's fingertips. Probably the most well known and widely used type of microcopy storage file comprises long strips of microfilm which are wound on reels. Such a file provides in most instances a highly satisfactory arrangement from which information is easily retrieved.

There is a continuing need, however, for improved methods and apparatus relating to specific aspects and problems in microcopy storage and retrieval. For example, the value of many record files is dependent upon the file containing only current information. Accordingly, it is desirable to have a file which can be easily updated. Where the file comprises a long strip wound on a reel, it is often impractical in both cost and convenience to delete or add limited amounts of information to the file. Therefore, in current status files it is advantageous to use a plurality of short strips of information-bearing microcopy because of the simplicity of adding or deleting a single unit in order to update the file. The present invention relates to the retrieval of a particular strip from such a file, and as in hereinafter more fully described, the invention can be used with transparent or opaque strips or sheets of any width. For simplicity of illustration, therefore, the term chip is used in this specification and is intended to mean any such information carrying member whether it be a sheet, strip card or the like.

It is known in the storage and retrieval art to store an individual film chip in a so-called "stick" holder in order to facilitate using the chip. Such a stick is positioned in a suitable viewing apparatus of either a transmission or reflection type so that an area of the selected film chip can be easily moved into registry with the optical axis thereof for viewing an enlarged projected image of such area. Where the quantity of microreproduced information in a particular record file becomes extensive, the storage requirements for a number of such holders partially offsets the savings in storage space resulting from such microreproduction. Accordingly, it is beneficial to store a plurality of chips in each holder.

The present invention comprises a novel apparatus which facilitates retrieving and segregating an information-bearing portion of a predetermined chip from a plurality of chips which preferably are stored in an overlapping shingled array so as to expose an end portion of each chip. In one of its aspects, the novel apparatus comprises a selector-shoe separator, first means for disposing such array in an accurately controlled position relative to said separator, second means for moving said separator and such array into engagement subsequent to such controlled positioning so as to deflect and space from the array the exposed portion of such a predetermined chip, and further means for moving said array after such deflection so as to selectively position in a viewing axis a portion of such predetermined chip without physically removing the chip from its relative position in the array.

One object of the present invention is to provide an improved apparatus for retrieving recorded information.

Another object of the present invention is to provide an apparatus for selecting one chip from a record file formed from a plurality of similar chips.

Still another object of the invention is to provide an apparatus for retrieving and selectively positioning for viewing an information-bearing portion of a predetermined chip without completely removing said chip from a file composed of a plurality of similar chips.

Yet another object of the present invention is to provide an apparatus for selecting a predetermined chip from a file comprised of a plurality of similar chips without the necessity of marking or otherwise coding the individual chips included in the file.

Still other objects of the present invention will become readily apparent to those skilled in the art from the following description, with reference to the accompanying drawings in which like characters denote like parts.

Figure 1:
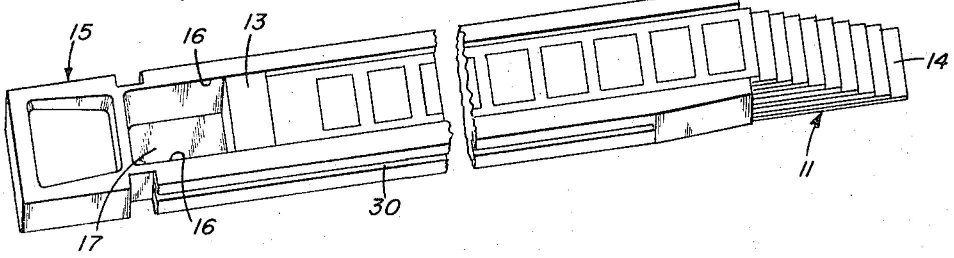
FIG. 1 is a perspective view of a stick holder in which a plurality of chips are stored.
Figure 2:
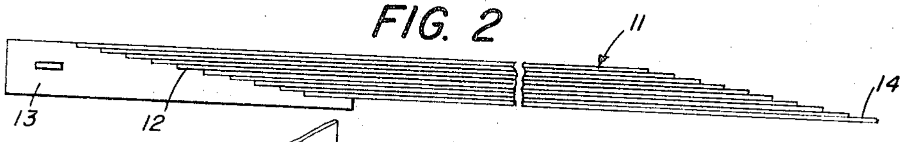
FIG. 2 illustrates a stepped mounting tab to which one end of such a plurality of individual chips are secured before the chips are placed in a stick holder.

According to a preferred embodiment of the present invention, a plurality of chips 11 are individually attached at one end to a respective step 12 on a mounting tap 13 so as to form an overlapping shingled array of said chips. The steps 12 of the mounting tab illustrated in FIG. 2 are equal in height to the thickness of the respective chips to be mounted thereon so that each chip is supported throughout a portion of its length. To simplify practicing the invention, it is preferable that the chips 11 that are attached to a single tab be uniform in length. However, from the following description of the preferred embodiment of the invention, it will become obvious that the chips 11 can be of any relative length so long as a short portion 14 of each chip is exposed in the shingled array. The tab 13 and attached chips 11 are inserted in a "stick" holder 15 in which the tab and chips are longitudinally movable. The side walls 16 and base 17 of the holder 15 function as a guideway which, with additional mechanism which is hereinafter described, cooperates to retrieve a preselected chip when the stick 15 is mounted in a suitable viewing apparatus such as for example a projection reader having an optical axis 18 and a lens system 19 as shown diagrammatically in FIG. 5.

Figure 6:
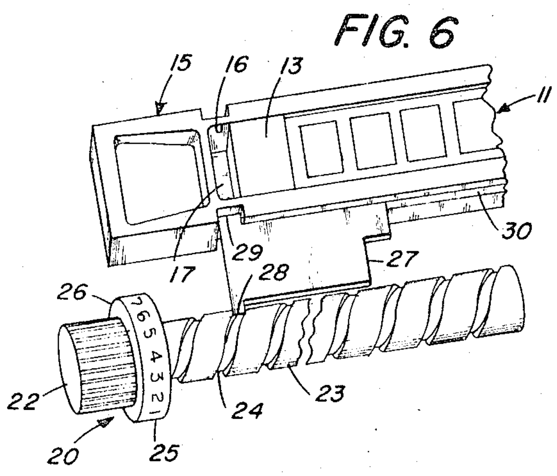
FIG. 6 is a perspective view of an indexing device for accurately positioning a predetermined chip relative to a separating device.

As illustrated in FIG. 6, an indexing device 20 which can be an integral part of the viewing apparatus is utilized to longitudinally move the mounting tab 13 along the guideway in the stick holder and the chips 11 in a first path, thereby accurately positioning the shingled array relative to a separating device 21 which can also be a part of the viewing apparatus. A control knob 22, which is presented to an operator for manual manipulation, is fixedly secured for rotation to a cylindrical cam 23 having a helical groove 24 formed in the peripheral surface thereof. A suitable indexing scale 25 is provided on flange 26 to indicate to the operator the longitudinal position in the guideway of the mounting tab 13, and consequently the position of the selected chip 11 relative to the separting device 21. Interconnecting member 27 is formed with a detent 28 which rides in the groove 24 and an ear 29 which engages the rear end of the mounting tab 13 through a longitudinal slot 30 in the sidewall 16 of the stick holder.

With this indexing device, a predetermined chip can be accurately positioned along the length of the holder. Rotation of knob 22 in a counterclockwise direction as shown in FIG. 6 forces detent 28 to ride along the groove 24. As a result of this force against detent 28, member 27 is moved longitudinally along the holder 15 and ear 29 pushes the tab 13 along the guideway. Knob 22 is rotated until the scale 25 on flange 26 indicates to the operator that the predetermined chip is selectively positioned relative to other elements of the retrieval mechanism, particularly the separating device 21. The indexing device 20 is preferably designed so that this selective longitudinal positioning of the tab 13 relative to the separating device 21, during the first step of retrieval, moves the exposed portion of the predetermined chip slightly beyond the end of the holder 15 so that at least such portion is not supported by the base of the holder. As more fully described hereinafter, retrieval of the chip is facilitated by such lack of support.

The separating device 21 comprises a separator plate 34 having a substantially straight leg 35, an L-shaped leg 36, and a base portion 37 which is utilized for mounting the device for movement along a second path which intersects the first path or the path in which the chips 11 are moved beyond the end of the holder 15. Both leg 35 and leg 36 can be formed of planar segments or they can be formed as segments of cylinders, each leg being tangential to the planar base portion 37. However, it is preferable that at least the end segments 38 and 39 of legs 35 and 36, respectively, curve from the plane of portion 37 so as to aid in guiding the chips as hereinafter described.

Using the orientation of the drawings, "vertical direction" is hereinafter used to mean in the plane of the base portion 37 of plate 34 and perpendicular to the arrow 40 in FIG. 3, while "horizontal direction" means parallel to the length of the chips in FIG. 3. The separator plate 34 is preferably formed so that when looking at the plate in side elevation, that is, in the direction indicated by the arrow 43 in FIG. 3, contacting lips 41 and 42 of end segments 38 and 39, respectively, are spaced apart in both a vertical and horizontal direction, the lip 42 of the L-shaped leg 36 being below and to the left of the lip 41 of leg 35. The vertical spacing of these lips is at least equal to the thickness of a chip, while the horizontal spacing is approximately the same as the exposed end portions 14 of the chips in the shingled array. This novel separating device provides an accurate retrieval means and is inexpensive to produce because it can be formed from a single sheet of material or otherwise integrally formed.

Figures 3, 4, 5:
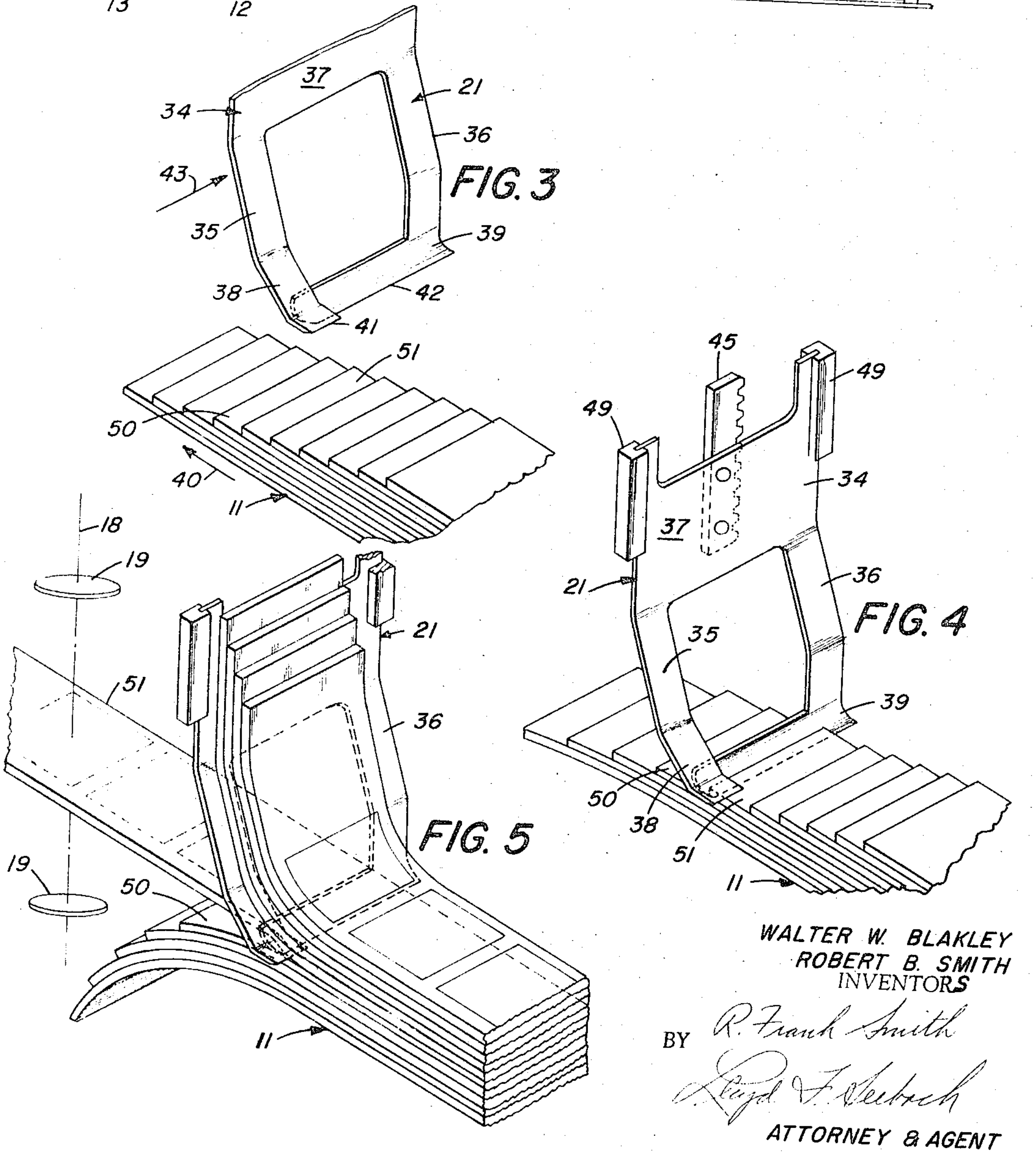
FIGS. 3, 4 and 5 show one embodiment of a selector-shoe separator as it is disposed relative to such a plurality at different steps during the retrieval of a predetermined chip.

Selection of a predetermined chip from a stepped array is schematically illustrated in FIGS. 3, 4 and 5. The separator plate 34 is mounted for movement along a path which intersects the path of the chips when the stepped array has been moved by indexing device 20 beyond the end of the holder 15. More specifically, the separator plate 34 is mounted so that when it is moved acros the path of the chips, the end of a predetermined chip will be intermediate of the horizontal spacing of the lips of end segments 38 and 39.

Figure 7:
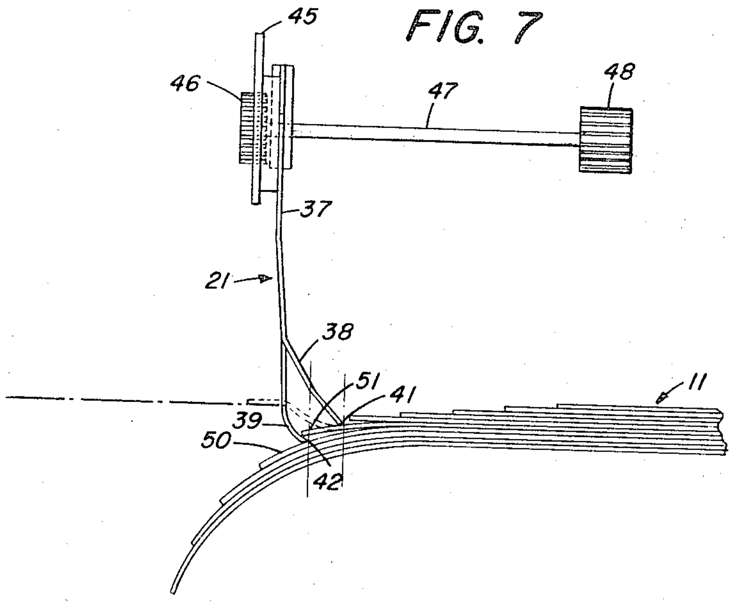
FIG. 7 is a diagrammatic side view of a device for accurately positioning a separating device relative to the predetermined chip.

After the array is so longitudinally positioned and the predetermined chip is accurately disposed relative to the separator for retrieval, the separator plate 34 is moved against the array. The means for moving the separator plate 34, see FIGS. 4 and 7, comprises a rack 45 that is secured to the plate 34 or formed integral therewith as along one of the edges thereof. The rack 45 meshes with a spur gear 46 fixed to a shaft 47, the latter being rotated by a knob 48 that is positioned adjacent the knob 22 in the viewing apparatus for manipulation by the operator. By such means, the plate 34 is reciprocated in a vertical direction in a pair of guide members 49.

Because of the vertical and horizontal spacing of the respective lips 41 and 42, the lip 42 contacts the exposed portion 14 of the chip 50 next below the pretermined chip 51. Since the ends of the chips have been moved past the end of the holder 15 and are not supported thereby, continued movement of the separator against the array bends chip 50 and all of the chips therebelow away from chip 51, as shown in FIG. 4. Simultaneously with the bending of said chips by lip 42, the lip 41 is moved into contact with chip 51 so that leg 35 bends the predetermined chip 51 away from the overlying chips but to a lesser degree than the chips deflected by lip 42. Accordingly, the end portion of chip 51 is spaced from all other chips in the file. Although not necessary to the invention, such deflection of the predetermined chip facilitates guiding chip 51 so that an area thereof can be moved into registry with viewing axis 18.

Inasmuch as the predetermined chip 51 can be any one of those in the array 11, separator plate 34 must be moved into a position such that the opening between lips 41 and 42 is substantially aligned with the lowermost chip in the array. When the lowermost chip is the predetermined chip, the lip 42 does not engage a chip but merely moves by the end of the predetermined chip. Lip 41, however, engages the exposed portion 14 of the lowermost chip so that the remaining chips are separated therefrom as described hereinafter.

At this step in the retrieval of chip 51, said chip is aligned with an opening substantially defined by the end segments 38 and 39 of the separator. By further moving the array along the guideway and against the separator plate 34 by rotation of knob 22, chip 51 is now directed over the end segment 39 of leg 36. The chips originally deflected by lip 42 are directed downward while the chips overlying the predetermined chip are directed upward by the lip 41 and leg 35. Thus, a selected area or portion of a predetermined chip can be easily located and positioned in registry with axis 18 for viewing without the necessity of physically removing said portion or chip from the record file of which it is a part. Because each of the chips in the plurality is fastened to the film mounting tab 13, returning the tab to its storage position in the holder by means of knob 22 also returns all of the chips to a storage position. After this operation, the separator plate 34 must also be returned to its upper position by means of knob 48 before another chip can be positioned relative thereto.

Although the invention has been described in considerable detail with particular reference to a preferred embodiment thereof, it will be understood that variations and modifications can be effected within the spirit and scope of the invention as described hereinabove and as defined in the appended claims.

The embodiments of the invention in which an exclusive property or privilege is claimed are defined as follows:

1. An apparatus for retrieving a predetermined chip from a plurality of similar chips which are arranged in a shingled array such that an end portion of each chip in said plurality can be exposed, comprising:

first guide means defining a first path for directing movement of such array thereon;

means defining a passage for separating said predetermined chip from said similar chips and being movable in a second path which intersects said first path;

first means for moving such array along said first path to align the end portion of said predetermined chip with respect to said separating means; and second means for selectively moving said separating means along said second path so that said separating means directs a portion of said predetermined chip away from the remaining chips in said array and along a path of retrieval.

2. Apparatus in accordance with claim 1 wherein said first guide means comprises a multiple chip storage holder and a mounting tab movable longitudinally in said holder and to which such shingled array is attached.

3. Apparatus in accordance with claim 1 including indexing means cooperating with said first moving means for indicating the end portion of the chip of such array that is aligned with said separating means.

4. Apparatus in accordance with claim 1 wherein said separating means comprises a member having a first contacting edge for engaging and deflecting away from said predetermined chip the end portion of a chip adjacent to said predetermined chip during movement of said separating means in said second path.

5. Apparatus in accordance with claim 4 wherein said member has a second contacting edge for engaging the end portion of said predetermined chip, said second contacting edge being spaced from said first contacting edge in a direction perpendicular to said first path by a distance which is of a magnitude at least equal to the thickness of said predetermined chip.

6. Apparatus in accordance with claim 5 wherein said first contacting edge and said second contacting edge are spaced apart in a direction corresponding to said first path by a distance which is of a magnitude less than the length of the exposed end portions of any two adjacent chips in said array.

7. Apparatus in accordance with claim 6 wherein said second path is substantially perpendicular to said first path.

8. Apparatus in accordance with claim 1 wherein said separating means includes:

second guide means for directing movement of said predetermined chip along said retrieval path after said predetermined chip is engaged by said separating means and for directing movement of the end portion of all other chips in said plurality away from said predetermined chip in at least one different path without complete removal of any chip from its relative position in said array.

9. A device for separating an end portion of a predetermined chip from a plurality of similar chips which are arranged in a shingled array such that an end portion of each chip in said array is exposed, comprising:

a mounting portion;

a first leg extending from said mounting portion and having a first contacting edge at the end thereof for engaging and deflecting away from such predetermined chip the exposed portion of a chip adjacent to said predetermined chip; and a second leg extending from said mounting portion in spaced relation to said first leg and having a second contacting edge at the end thereof for engaging said predetermined chip, said first and said second contacting edges being spaced apart in one direction parallel to the plane of said mounting portion a distance which is of a magnitude at least equal to the thickness of said predetermined chip.

10. A device in accordance with claim 9 wherein said first and said second contacting edges are spaced apart in a second direction by a distance which is of a magnitude less than the total length of the exposed end portions of any two adjacent chips in said array.

11. A device in accordance with claim 9 wherein said first leg comprises a substantially L-shaped member having a cross-arm extending generally toward said second leg and curving away from the plane of said mounting portion toward said second leg.

12. A device in accordance with claim 10 wherein said second leg extends in said second direction away from the plane of said mounting portion.

13. An apparatus for retrieving a predetermined chip from a plurality of similar chips which are arranged in a shingled array such that the end portion of each chip in said plurality can be exposed, comprising means for selectively moving said array along a first path so that the exposed end portion of said predetermined chip is positioned for separation from said array; and means movable in a second path intersecting said first path and including separator means for intercepting said selectively positioned array and deflecting said similar chips in said array away from said predetermined chip so as to direct said predetermined chip along a path of retrieval separate from the remaining chips in said array.

14. An apparatus for retrieving a predetermined chip from a plurality of similar chips which are arranged in a shingled array such that the end portion of each chip in said plurality can be exposed, comprising means for selectively moving said array along a first path; and separator means adjustably movable in a second path intersecting said first path to an operative position in which portions of said separator means respectively intercept said array on both sides of the end portion of said predetermined chip so that upon movement of said array toward said separator means, said predetermined chip is separated from said similar chips.

15. An apparatus for retrieving a predetermined chip from a plurality of similar chips which are arranged in a shingled array such that the end portion of each chip in said plurality can be exposed, comprising means for selectively positioning said array relative to said apparatus;

separating means movable into contact with said selectively positioned array for directing said predetermined chip along a separate retrieval path and for directing the remaining chips in said array away from said predetermined chip on at least one other path; and means for moving said array against said separating means so that said predetermined chip is moved along said retrieval path and the remaining chips in said array are moved away from said predetermined chip.

References Cited

UNITED STATES PATENTS 3,055,131 9/1962 Novak ---------------- 40—36

EUGENE R. CAPOZIO, *Primary Examiner.*

W. GRIEB, *Assistant Examiner.*